(12) United States Patent
Sunagawa et al.

(10) Patent No.: US 10,808,361 B2
(45) Date of Patent: Oct. 20, 2020

(54) SHEETS AND METHOD FOR PRODUCING SHEETS

(71) Applicant: OJI HOLDINGS CORPORATION, Tokyo (JP)

(72) Inventors: Hirokazu Sunagawa, Tokyo (JP); Koh Sakai, Chiba (JP); Hayato Fushimi, Chiba (JP); Go Banzashi, Chiba (JP)

(73) Assignee: OJI HOLDINGS CORPORATION, Tokyo (JP)

( * ) Notice: Subject to any disclaimer, the term of this patent is extended or adjusted under 35 U.S.C. 154(b) by 166 days.

(21) Appl. No.: 15/779,612

(22) PCT Filed: Nov. 25, 2016

(86) PCT No.: PCT/JP2016/084889
§ 371 (c)(1),
(2) Date: May 29, 2018

(87) PCT Pub. No.: WO2017/094595
PCT Pub. Date: Jun. 8, 2017

(65) Prior Publication Data
US 2018/0371696 A1    Dec. 27, 2018

(30) Foreign Application Priority Data
Nov. 30, 2015  (JP) ................. 2015-232847

(51) Int. Cl.
*D21H 19/32*  (2006.01)
*D21H 19/72*  (2006.01)
(Continued)

(52) U.S. Cl.
CPC ............. *D21H 19/32* (2013.01); *B32B 23/02* (2013.01); *B32B 27/12* (2013.01); *D21H 11/18* (2013.01);
(Continued)

(58) Field of Classification Search
CPC ........ D21H 19/72; D21H 11/18; D21H 19/16; D21H 19/32; D21H 19/20; D21H 15/02;
(Continued)

(56) References Cited

U.S. PATENT DOCUMENTS 8,372,764 B2    2/2013  Yano et al.
2009/0305033 A1  12/2009  Yano et al.
(Continued)

FOREIGN PATENT DOCUMENTS

CA      2 917 792 C    3/2018
EP      2 644 371 A1   10/2013
(Continued)

OTHER PUBLICATIONS

International Preliminary Report on Patentability with translation of Written Opinion dated Jun. 14, 2018, issued by the International Searching Authority in application No. PCT/JP2016/084889.
(Continued)

*Primary Examiner* — Eric Hug
(74) *Attorney, Agent, or Firm* — Sughrue Mion, PLLC

(57) ABSTRACT

It is an object of the present invention to provide a composite sheet, which achieves all of water repellency, water resistance, transparency and mechanical strength. The present invention relates to a sheet having a fiber layer and a coating layer on the fiber layer, wherein the fiber layer comprises ultrafine cellulose fibers having a fiber width of 1000 nm or less in an amount of 60% by mass or more, the haze of the sheet is 20% or less, and the water contact angle of the surface of the sheet on the side of the coating layer which is measured 30 seconds after completion of the dropping of distilled water is 70 degrees or more.

10 Claims, 2 Drawing Sheets

(51) Int. Cl.
*D21H 19/16* (2006.01)
*D21H 19/20* (2006.01)
*D21H 11/18* (2006.01)
*B32B 23/02* (2006.01)
*B32B 27/12* (2006.01)

(52) U.S. Cl.
CPC ............. *D21H 19/16* (2013.01); *D21H 19/20* (2013.01); *D21H 19/72* (2013.01)

(58) Field of Classification Search
CPC .... D21H 19/76; D21H 5/0077; D21H 5/1236; B32B 23/02; B32B 27/12; B32B 23/08; B32B 23/06; B32B 27/10; B32B 27/283; B32B 27/30; B32B 27/308; B32B 27/28
See application file for complete search history.

(56) References Cited

U.S. PATENT DOCUMENTS

| | | | |
|---|---|---|---|
| 2014/0234640 | A1 | 8/2014 | Kohno et al. |
| 2017/0043565 | A1* | 2/2017 | Fushimi .................. B32B 15/20 |

FOREIGN PATENT DOCUMENTS

| | | | |
|---|---|---|---|
| JP | 2008-024778 A | 2/2008 | |
| JP | 2009040056 A | 2/2009 | |
| JP | 2010-23275 A | 2/2010 | |
| JP | 2010-156068 A | 7/2010 | |
| JP | 2010-179579 A | 8/2010 | |
| JP | 2010-197680 A | 9/2010 | |
| JP | 2011-149124 A | 8/2011 | |
| JP | 2012128157 A | 7/2012 | |
| JP | 2013-127141 A | 6/2013 | |
| JP | 2015-17184 A | 1/2015 | |
| JP | 2015-187205 A | 10/2015 | |
| TW | 201438864 A | 10/2014 | |
| TW | 201542366 A | 11/2015 | |
| WO | 2013/031687 A1 | 3/2013 | |
| WO | 2014/119514 A1 | 8/2014 | |
| WO | 2014/147295 A1 | 9/2014 | |
| WO | 2015/163281 A1 | 10/2015 | |
| WO | WO 2015/163281 * | 10/2015 | ............. B32B 27/12 |

OTHER PUBLICATIONS

International Search Report and Written Opinion dated Feb. 28, 2017, issued by the International Searching Authority in application No. PCT/JP2016/084889.
Office Action dated Jun. 18, 2019 in corresponding Korean Application No. 10-2018-7017170.
Extended European Search Report dated Apr. 29, 2019 in corresponding European Application No. 16870532.5.
Communication dated Apr. 23, 2020, from the State Intellectual Property Office of P.R. China in Chinese application No. 201680069813.3.
Communication dated May 26, 2020, from the Japanese Patent Office in Japanese application No. 2017-553811.
Office Action dated Aug. 18, 2020, issued by the Taiwanese Patent Office in Taiwanese application No. 105139069.

* cited by examiner

[Figure 1]
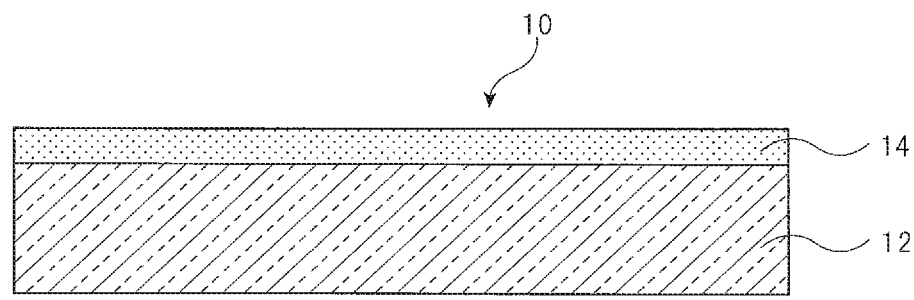

[Figure 2]
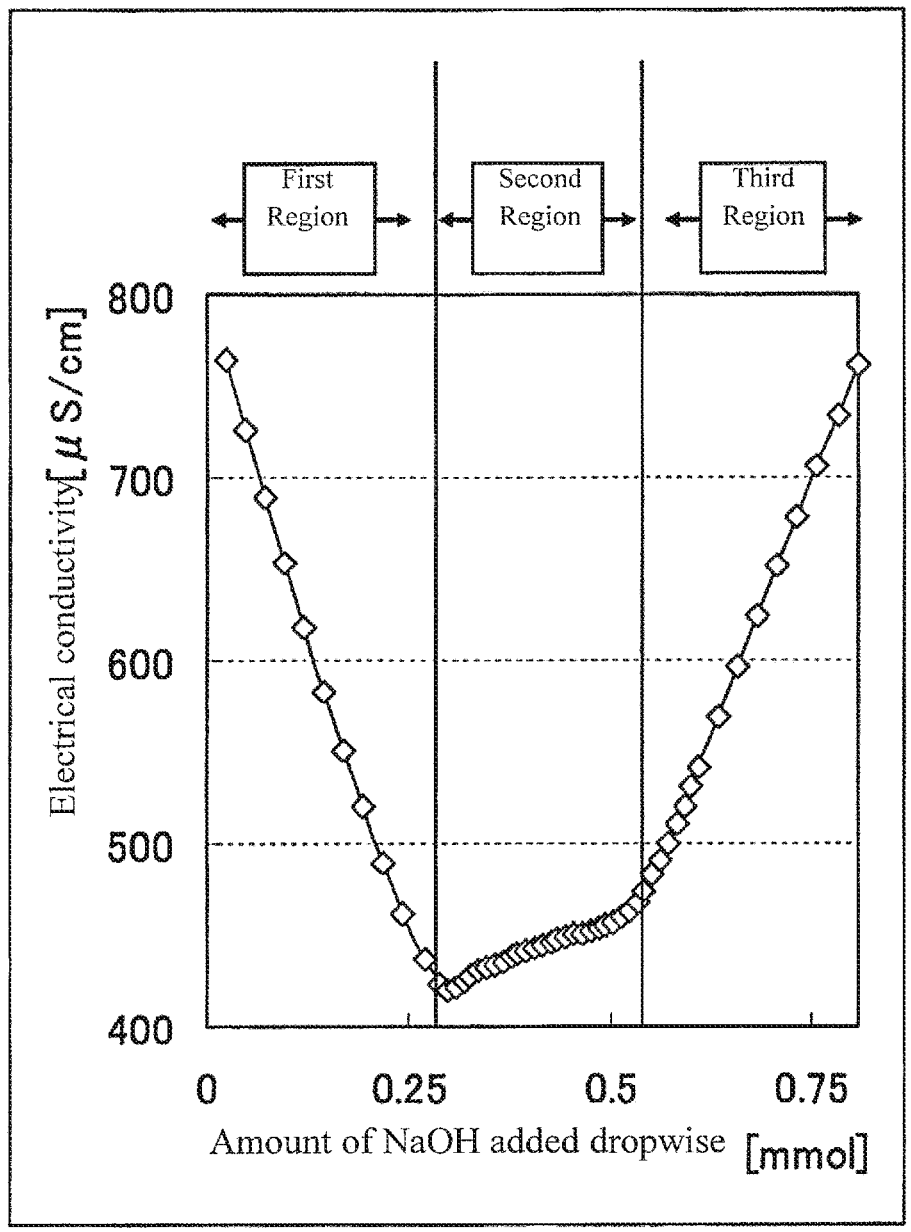

SHEETS AND METHOD FOR PRODUCING SHEETS

CROSS REFERENCE TO RELATED APPLICATIONS

This application is a National Stage of International Application No. PCT/JP2016/084889 filed Nov. 25, 2016, claiming priority based on Japanese Patent Application No. 2015-232847 filed Nov. 30, 2015.

TECHNICAL FIELD

The present invention relates to a sheet and a method for producing a sheet. Specifically, the present invention relates to a sheet produced by laminating a coating layer on a fiber layer comprising ultrafine cellulose fibers, wherein the sheet is excellent in terms of transparency and water repellency.

BACKGROUND ART

In recent years, because of enhanced awareness of alternatives to petroleum resources and environmental consciousness, there has been a focus on materials utilizing reproducible natural fibers. Among natural fibers, cellulose fibers having a fiber diameter of 10 μm or more and 50 μm or less, in particular, wood-derived cellulose fibers (pulp) have been widely used mainly as paper products so far.

Ultrafine cellulose fibers having a fiber diameter of 1 μm or less are also known as such cellulose fibers. Moreover, a sheet that is composed of such ultrafine cellulose fibers, and a composite sheet comprising ultrafine cellulose fibers and a resin or an oil component have been developed. Since the contacts of fibers are significantly increased in a sheet or composite sheet comprising ultrafine cellulose fibers, it has been known that tensile strength and the like are significantly improved in such a sheet or a composite sheet.

As such a composite sheet, for example, a gas barrier material, which comprises an oil component and ultrafine cellulose fibers having an average fiber diameter of 200 nm or less and containing a carboxyl group, has been known (Patent Document 1). In the case of such a gas barrier material, the oil component has been mixed with an ultrafine cellulose fiber-containing slurry and a sheet has been then formed from the mixed slurry, and the water contact angle of the obtained sheet has been reported to be 20 degrees or more and 120 degrees or less. In addition, Patent Document 2 discloses a gas barrier laminate consisting of a polylactic acid layer and an ultrafine cellulose fiber-containing layer having an average fiber diameter of 200 nm or less. In this gas barrier laminate, the water contact angle of the surface of the polylactic acid layer on the side of the ultrafine cellulose fiber-containing layer is regulated to be 20 degrees or more and 60 degrees or less.

Patent Document 3 discloses an optical film, which has a base material film formed by mixing ultrafine cellulose fibers having an average fiber diameter of 4 nm or more and 200 nm or less with an acrylic resin, and a hard coating layer. In this optical film, the ultrafine cellulose fibers and the acrylic resin are homogeneously dispersed in the base material film, and the content of the ultrafine cellulose fibers in the base material film is considered to be preferably 60% by mass or less. Moreover, Patent Document 4 discloses a fiber composite material having a coating layer that is laminated on the surface of a sheet containing ultrafine cellulose fibers having an average fiber diameter of 4 nm or more and 200 nm or less. In Example 1 of Patent Document 4, a composite sheet, to which a resin tape has been adhered, has been produced on the surface of an ultrafine cellulose fiber-containing sheet, and in Example 2 and the like of Patent Document 4, a composite sheet has been produced by forming an acrylic resin layer on the surface of a cotton sheet.

PRIOR ART DOCUMENTS

Patent Documents

Patent Document 1: JP-A-2010-156068
Patent Document 2: JP-A-2010-179579
Patent Document 3: JP-A-2010-197680
Patent Document 4: JP-A-2008-024778

SUMMARY OF INVENTION

Object to be Solved by the Invention

As mentioned above, composite sheets having various aspects have been developed. However, the gas barrier material disclosed in Patent Document 1 has been problematic in that the oil component is not homogeneously dispersed in the composite sheet, so that sufficient water resistance or transparency cannot be obtained. In the case of the gas barrier laminate disclosed in Patent Document 2, the polylactic acid layer does not have sufficient water repellency, and there is still a problem regarding transparency. Furthermore, the optical film of Patent Document 3 does not achieve both transparency and mechanical strength, and this optical film has been problematic in that if the mechanical strength thereof intends to be enhanced, the transparency of the optical film as a whole is impaired. Further, in the fiber composite material of Patent Document 4, a coating layer is laminated on the surface of a fiber aggregate having mechanical strength and voids to smoothen the surface, thereby enhancing transparency. However, as a result of the studies conducted by the present inventors, it has been revealed that the transparency is insufficient.

Hence, in order to solve the aforementioned problems of the prior art techniques, the present inventors have conducted studies for the purpose of providing a composite sheet that achieves all of water repellency, water resistance, transparency and mechanical strength.

Means for Solving the Object

As a result of intensive studies conducted directed towards achieving the aforementioned object, the present inventors have found that a sheet achieving all of water repellency, water resistance, transparency and mechanical strength can be obtained by laminating a coating layer capable of exhibiting predetermined water contact angle on a fiber layer, and further allowing the fiber layer to comprise ultrafine cellulose fibers in a predetermined amount or more.

Specifically, the present invention is configured as follows:

[1] A sheet having a fiber layer and a coating layer on the fiber layer, wherein
the fiber layer comprises ultrafine cellulose fibers having a fiber width of 1000 nm or less in an amount of 60% by mass or more,
the haze of the sheet is 20% or less, and
the water contact angle of the surface of the sheet on the side of the coating layer which is measured 30 seconds after completion of the dropping of distilled water is 70 degrees or more.

[2] The sheet according to [1], wherein the coating layer comprises at least one selected from a silicon-containing compound, a fluorine-containing compound, and an acrylic resin.

[3] The sheet according to [1] or [2], wherein when the thickness of the fiber layer is defined as $T_1$ and the thickness of the coating layer is defined as $T_2$, the value of $T_1/T_2$ is 2 or more and 200 or less.

[4] The sheet according to any one of [1] to [3], wherein the total light transmittance is 60% or more.

[5] The sheet according to any one of [1] to [4], wherein the haze is 5% or less.

[6] The sheet according to any one of [1] to [5], wherein the density of the fiber layer is 1.0 g/cm³ or more.

[7] The sheet according to any one of [1] to [6], wherein when a cross cut test is carried out in accordance with JIS K 5400, the number of peeling in 100 grids of the fiber layer is 10 or less.

[8] The sheet according to any one of [1] to [7], wherein the tensile elastic modulus is 5 GPa or more.

[9] The sheet according to any one of [1] to [8], wherein the coating layer is an application layer.

[10] A method for producing a sheet, comprising
obtaining a fiber layer comprising ultrafine cellulose fibers having a fiber width of 1000 nm or less, and
applying a coating layer-forming composition to at least one surface of the fiber layer, wherein
the haze of the sheet is 20% or less, and
the water contact angle of the surface of the sheet on the side of the coating layer which is measured 30 seconds after completion of the dropping of distilled water is 70 degrees or more.

[11] The method for producing a sheet according to [10], wherein the coating layer-forming composition comprises at least one selected from a silicon-containing compound, a fluorine-containing compound, and an acrylic monomer.

Advantageous Effects of Invention

According to the present invention, a sheet, which achieves all of water repellency, water resistance, transparency and mechanical strength, can be obtained.

BRIEF DESCRIPTION OF DRAWINGS

FIG. 1 is a cross-sectional view showing a configuration of the sheet of the present invention.

FIG. 2 is a graph showing the relationship between the amount of NaOH added dropwise to a fiber raw material and electrical conductivity.

EMBODIMENT OF CARRYING OUT THE INVENTION

Hereinafter, the present invention will be described in detail. The description for components described below will be based on representative embodiments or specific examples; however, the present invention will not be limited to such embodiments.

(Sheet)

The present invention relates to a sheet having a fiber layer and a coating layer on the fiber layer. Herein, the fiber layer comprises ultrafine cellulose fibers having a fiber width of 1000 nm or less in an amount of 60% by mass or more. In addition, the haze of the sheet is 20% or less, and the water contact angle of the surface of the sheet on the side of the coating layer which is measured 30 seconds after completion of the dropping of distilled water is 70 degrees or more. The surface of the sheet on the side of the coating layer means one surface of the coating layer, which is opposite to the surface on which the fiber layer is laminated.

FIG. 1 is a cross-sectional view showing a configuration of the sheet of the present invention. As shown in FIG. 1, a sheet 10 of the present invention has a fiber layer 12, and a coating layer 14 on at least one surface of the fiber layer 12. FIG. 1 shows the sheet 10, in which the coating layer 14 is laminated on one surface of the fiber layer 12. In the present invention, however, the sheet 10 may also be configured by laminating the coating layers 14 on both surfaces of the fiber layer 12. Moreover, it is preferable that the fiber layer 12 and the coating layer 14 be laminated on each other in a state in which they are contacted with each other. Besides, the sheet 10 of the present invention may further have another layer on the coating layer 14.

Since the sheet of the present invention has the above-described configuration, it is excellent in terms of water repellency and water resistance. In this context, excellent water repellency means a water contact angle of 70 degrees or more. Water resistance can be evaluated based on the traces of water droplets remaining after the dropping of water on the surface of the sheet. The sheet having no such traces of water droplets is considered to be excellent in terms of water resistance. The sheet of the present invention is characterized in that it comprises both water repellency and water resistance. It is to be noted that, in the present description, evaluation of water repellency and water resistance means evaluation of the surface of the sheet on the side of the coating layer in terms of water repellency and water resistance.

Moreover, since the sheet of the present invention has a fiber layer comprising ultrafine cellulose fibers with a fiber width of 1000 nm or less, it is excellent in terms of transparency. The transparency of the sheet can be evaluated based on the haze of the sheet. Furthermore, in the present invention, since the fiber layer comprises ultrafine cellulose fibers in an amount of 60% by mass or more, the sheet of the present invention also has high mechanical strength. That is to say, the sheet of the present invention is also characterized in that it also has transparency and mechanical strength.

The water contact angle of the surface of the sheet of the present invention on the side of the coating layer which is measured 30 seconds after completion of the dropping of distilled water may be 70 degrees or more, and it is preferably 75 degrees or more, and more preferably 80 degrees or more. By setting the water contact angle of the sheet within the above-described range, the water repellency of the sheet can be more effectively enhanced.

The coating layer comprised in the sheet of the present invention is a layer that coats the surface of the fiber layer, and it is a thin film layer. Specifically, when the thickness of the fiber layer is defined as $T_1$ and the thickness of the coating layer is defined as $T_2$, the value of $T_1/T_2$ is preferably 2 or more. The $T_1/T_2$ value is more preferably 5 or more, even more preferably 8 or more, and further preferably 10 or more. On the other hand, the $T_1/T_2$ value is preferably 200 or less. By setting the $T_1/T_2$ value within the above-described range, the mechanical strength of the entire sheet can be enhanced, and a sheet that is also excellent in terms of transparency can be obtained.

The thickness of the fiber layer is preferably 1 µm or more, more preferably 3 µm or more, and further preferably 5 µm or more. On the other hand, the thickness of the fiber layer is preferably 1 mm or less, more preferably 500 µm or less, and further preferably 100 µm or less.

The thickness of the coating layer is preferably 0.1 μm or more, more preferably 0.5 μm or more, and further preferably 1 μm or more. On the other hand, the thickness of the coating layer is preferably 100 μm or less, more preferably 50 μm or less, and further preferably 20 μm or less. It is to be noted that the above-described thickness of the coating layer means the thickness of the coating layer laminated on one surface of the fiber layer. In a case where the coating layers are laminated on both surfaces of the fiber layer, the coating layer laminated on each surface preferably satisfies the above-described range.

The coating layers may be laminated on both surfaces of the fiber layer. In this case, the thicknesses of the coating layers on both surfaces may be identical to each other, or the thicknesses of the coating layers on both surfaces may be different from each other mainly for the purpose of controlling curl.

The haze of the sheet of the present invention may be 20% or less, and it is preferably 15% or less, more preferably 10% or less, further preferably 5% or less, and particularly preferably 3% or less. The lower limit value of the haze of the sheet is not particularly limited, and it can be set, for example, at 0.1%. The haze of the sheet is a value measured in accordance with JIS K 7136, using a haze meter (HM-150, manufactured by Murakami Color Research Laboratory Co., Ltd.).

The total light transmittance of the sheet of the present invention is preferably 60% or more, more preferably 70% or more, further preferably 80% or more, and particularly preferably 90% or more. The upper limit value of the total light transmittance of the sheet is not particularly limited, and it can be set, for example, at 99.9%. The total light transmittance of the sheet is a value measured in accordance with JIS K 7361, using a haze meter (HM-150, manufactured by Murakami Color Research Laboratory Co., Ltd.).

The sheet of the present invention is excellent in terms of adhesion properties between the fiber layer and the coating layer. Specifically, in a cross cut test performed on the sheet in accordance with JIS K 5400, the number of peeling in 100 grids of the fiber layer is preferably 10 or less, more preferably 5 or less, and further preferably 3 or less.

A method for evaluating adhesion properties in accordance with JIS K 5400 is specifically as follows: First, 100 cross cuts of 1 mm$^2$ are made on a surface of the sheet on the side of the fiber layer. A cellophane tape (manufactured by NICHIBAN CO., LTD.) is attached thereon and pressed with load of 1.5 kg/cm$^2$. Then, the tape is peeled in the 90° direction, and the number of peeled grids (1 mm$^2$ square grids) is counted. The number of these grids is defined as a peeled number in 100 grids.

The tensile elastic modulus of the sheet of the present invention is preferably 5 GPa or more, more preferably 7 GPa or more, and further preferably 10 GPa or more. The tensile elastic modulus of the sheet is a value measured in accordance with JIS P 8113, and it is a tensile elastic modulus measured at a temperature of 23° C. and a relative humidity of 50%. As a tensile testing machine, Tensile Tester CODE SE-064 (manufactured by Lorentzen & Wettre Ltd.) may be used. In the present description, a sheet having a high tensile elastic modulus means a sheet having excellent mechanical strength.

The sheet of the present invention is also excellent in terms of water resistance. Water resistance can be evaluated by adding dropwise 1 mL of distilled water onto the surface of the sheet on the side of the coating layer, then, 30 seconds after the dropwise addition, wiping off the dropped water from the sheet using KimWipes (manufactured by NIPPON PAPER CRECIA Co., LTD.), and then examining the traces of water droplets remaining on the surface of the sheet. In the present invention, it is preferable that completely no traces of water droplets remain on the surface of the sheet according to the above-described evaluation method.

Moreover, the water contact angle of the surface of the sheet of the present invention on side of the coating layer which is measured 1 hour after completion of the dropping of distilled water is preferably 70 degrees or more. In the present invention, even in a case where 1 hour has passed after completion of the dropping of distilled water, a high water contact angle can be maintained. From these results, it is found that the sheet of the present invention is excellent in terms of water resistance.

Besides, various physical properties of the sheet, such as haze, total light transmittance, tensile elastic modulus and water resistance, and also, adhesion properties between the fiber layer and the coating layer, can be adjusted by appropriately selecting the composition of the fiber layer and the coating layer, the thickness thereof, the formation method thereof, etc.

(Fiber Layer)

The fiber layer comprises ultrafine cellulose fibers having a fiber width of 1000 nm or less. The content of ultrafine cellulose fibers in the fiber layer may be 60% by mass or more based on the total mass of the fiber layer, and it is preferably 70% by mass or more, more preferably 80% by mass or more, and further preferably 90% by mass or more.

<Ultrafine Cellulose Fibers>

Although there is no particular restriction on a cellulose fiber raw material for yielding ultrafine cellulose fibers, pulp is preferably used from the viewpoint of availability and inexpensiveness. The pulp may be selected from wood pulp, non-wood pulp, and deinked pulp. Examples of wood pulp include chemical pulp, such as leaf bleached kraft pulp (LBKP), needle bleached kraft pulp (NBKP), sulfite pulp (SP), dissolving pulp (DP), soda pulp (AP), unbleached kraft pulp (UKP), and oxygen bleached kraft pulp (OKP). Further, included are, but not particularly limited to, semichemical pulp, such as semi-chemical pulp (SCP), and chemi-ground wood pulp (CGP); and mechanical pulp, such as ground pulp (GP), and thermomechanical pulp (TMP, BCTMP). Examples of non-wood pulp include, but not particularly limited to, cotton pulp, such as cotton linter, and cotton lint; non-wood type pulp, such as hemp, wheat straw, and bagasse; and cellulose isolated from ascidian, seaweed, etc., chitin, chitosan and the like. As a deinked pulp, there is deinked pulp using waste paper as a raw material, but it is not particularly limited thereto. The pulp types according to this embodiment may be used singly, or in combination of two or more types. Among the above-listed pulp types, wood pulp and deinked pulp including cellulose are preferred from the viewpoint of easy availability. Among wood pulp, chemical pulp is preferred because the same has a higher cellulose content to enhance the yield of ultrafine cellulose fibers and decomposition of cellulose in the pulp is mild at the time of ultrafine fiber formation (defibration) to yield ultrafine cellulose fibers having a long fiber length with a high aspect ratio. Among them, kraft pulp and sulfite pulp are most preferably selected. A sheet containing the ultrafine cellulose fibers having a long fiber length with a high aspect ratio tends to exhibit a high strength.

The average fiber width of the ultrafine cellulose fibers is 1000 nm or less, when the fibers are observed under an electron microscope. The average fiber width is preferably 2 nm or more and 1000 nm or less, more preferably 2 nm or more and 100 nm or less, even more preferably 2 nm or more and 50 nm or less, and further preferably 2 nm or more and 10 nm or less, but it is not particularly limited thereto. When the average fiber width of the ultrafine cellulose fibers is less than 2 nm, the fibers are dissolved in water as cellulose molecules, and thus, the physical properties of ultrafine cellulose fibers (strength, rigidity, and dimensional stability) tend to be hardly expressed. It is to be noted that the ultrafine cellulose fibers are cellulose monofibers having a fiber width of, for example, 1000 nm or less.

The measurement of the average fiber width of the cellulose fibers is carried out as follows. A slurry containing ultrafine fibers of 0.05 to 0.1% by mass in concentration is prepared, and the prepared slurry is then cast on a carbon film-coated grid Which has been subjected to a hydrophilic treatment to thereby make a sample for TEM observation. In the case where the slurry contains fibers having large widths, the SEM image of the surface of the slurry cast on a glass may be observed. The sample is observed by electron microscopy imaging at a magnification of 1000, 5000, 10000 or 50000, depending on the width of fibers constituting the sample. Provided that the sample, the observation condition and the magnification are adjusted so as to meet the following conditions.

(1) A single straight line X is drawn in any given portion in an observation image, and 20 or more fibers intersect with the straight line X.

(2) A straight line Y, which intersects perpendicularly with the aforementioned straight line in the same image as described above, is drawn, and 20 or more fibers intersect with the straight line Y.

The widths of the fibers intersecting the straight line X and the straight line Y in the observation image meeting the above-described conditions are visually read. 3 or more sets of images of surface portions, which are at least not overlapped, are thus observed, and the widths of the fibers intersecting the straight line X and the straight line Y are read in the each image. At least 120 fiber widths (20 fibers×2×3=120) are thus read. The average fiber width is an average value of the fiber widths thus read.

The fiber length of the ultrafine cellulose fibers is not particularly limited, and it is preferably 0.1 μm or more and 1000 μm or less, more preferably 0.1 μm or more and 800 μm or less, and particularly preferably 0.1 μm or more and 600 μm or less. By setting the fiber length within the above-described range, destruction of the crystalline region of the ultrafine cellulose fibers can be suppressed, and the slurry viscosity of the ultrafine cellulose fibers can be set within an appropriate range. It is to be noted that the fiber length of the ultrafine cellulose fibers can be obtained by an image analysis using TEM, SEM or AFM.

Ultrafine cellulose fibers preferably have a type I crystal structure. In this regard, that ultrafine cellulose fibers have a type I crystal structure may be identified by a diffraction profile obtained from a wide angle X-ray diffraction photograph using CuKα (λ=1.5418 Å) monochromatized with graphite. Specifically, it may be identified by that there are typical peaks at two positions near 2θ=14 to 17°, and near 2θ=22 to 23°.

The percentage of the type I crystal structure occupied in the ultrafine cellulose fibers is preferably 30% or more, more preferably 50% or more, and further preferably 70% or more.

The rate of a crystal portion comprised in ultrafine cellulose fibers is not particularly limited in present invention. It is preferable to use cellulose, in which the crystallinity obtained by an X-ray diffractometry is 60% or more. The crystallinity is preferably 65% or more, and more preferably 70% or more. In this case, more excellent performance can be expected, in terms of heat resistance and the expression of low linear thermal expansion. The crystallinity can be obtained by measuring an X-ray diffraction profile and obtaining it according to a common method (Seagal et al., Textile Research Journal, Vol. 29, p. 786, 1959).

<Chemical Treatment>

Ultrafine cellulose fibers are obtained by performing a defibration treatment on a cellulose raw material. Further, in the present invention, substituents are preferably added to ultrafine cellulose fibers by performing a chemical treatment on the cellulose raw material before the defibration treatment. The substituent to be added to ultrafine cellulose fibers is preferably an ionic substituent, and is more preferably an anionic group. Examples of the anionic group include at least one substituent selected from a phosphoric acid group or a phosphoric acid group-derived substituent (which is simply referred to as a phosphoric acid group at times), a carboxyl group, and a sulfone group. Among others, the anionic substituent is preferably at least one selected from a phosphoric acid group and a carboxyl group, and is more preferably a phosphoric acid group.

The ultrafine cellulose fibers used in the present invention preferably have 0.1 mmol/g or more and 3.5 mmol/g or less of anionic substituents per gram (mass) of the ultrafine cellulose fibers. Ultrafine cellulose fibers having the aforementioned anionic substituents at the above-described ratio are preferable because such ultrafine cellulose fibers may be ultra-finely fibrillated by an electrostatic repulsion effect.

<General Chemical Treatments>

There is no particular restriction on a method of chemical treatment of a cellulose raw material, insofar as it is a method capable of obtaining ultrafine fibers. Examples of a chemical treatment include an acid treatment, an ozone treatment, a TEMPO (2,2,6,6-tetramethylpiperidine-1-oxyl radical) oxidation treatment, an enzymatic treatment, and a treatment with a compound capable of forming a covalent bond with a functional group in cellulose or a fiber raw material.

As an example of an acid treatment, there is a method described in Otto van den Berg, Jeffrey R. Capadona; Christoph Weder; Biomacromolecules 2007, 8, 1353-1357. Specifically, ultrafine cellulose fibers are hydrolyzed by sulfuric acid, hydrochloric acid, or the like. In the case of a product by a high-concentration acid treatment, almost all amorphous regions are decomposed so that short fibers are produced (also called as cellulose nanocrystals), but these are also included in ultrafine cellulose fibers.

An example of the ozone treatment is the method described in JP 2010-254726 A, but the example of the ozone treatment is not particularly limited thereto. Specifically, fibers are treated with ozone and are then dispersed in water, and the thus obtained aqueous dispersion of fibers is subjected to a pulverization treatment.

As an example of TEMPO oxidation, there is a method described in Saito, T, et al., "Homogeneous suspensions of individualized microfibrils from TEMPO-catalyzed oxidation of native cellulose", Biomacromolecules, 2006, 7(6), 1687-91. Specifically, after a TEMPO oxidation treatment of fibers, the same are dispersed in water, and the obtained aqueous suspension of the fibers is subjected to a pulverization treatment.

One example of the enzyme treatment can include, but are not particularly limited to, a method described in International Publication No. WO 2013/176033 (the contents described in International Publication No. WO 2013/176033 are incorporated herein by reference in its entirety). Specifically, this method involves treating the fiber raw material with an enzyme at least under a condition where the ratio between the EG activity and the CBHI activity of the enzyme is 0.06 or more.

As an example of a treatment with a compound capable of forming a covalent bond with a functional group in cellulose or a fiber raw material, there is a method described in International Publication WO2013/073652 (PCT/JP2012/079743) in which "at least one compound selected out of an oxo acid, or a polyoxoic acid, having a phosphorus atom in the structure, and salts thereof" is used.

<Anionic Substituent Introduction>

The ultrafine cellulose fibers preferably have anionic substituents. Among others, the anionic group is preferably at least one selected from a phosphoric acid group, a carboxyl group and a sulfone group, more preferably at least one selected from a phosphoric acid group and a carboxyl group, and particularly preferably a phosphoric acid group.

<Amount of Substituents Introduced>

The amount of anionic substituents introduced is not particularly limited, but it is, per 1 g (mass) of the ultrafine cellulose fibers, preferably 0.1 mmol/g or more, more preferably 0.2 mmol/g or more, further preferably 0.3 mmol/g or more, and particularly preferably 0.5 mmol/g or more. The amount of anionic substituents introduced is also preferably 3.5 mmol/g or less, more preferably 3.0 mmol/g or less, further preferably 2.5 mmol/g or less, and particularly preferably 2.0 mmol/g or less. By setting the amount of anionic substituents introduced within the above-described range, it may become easy to make the fiber raw material ultrafine, and the stability of the ultrafine cellulose fibers can be enhanced.

<Introduction of Phosphoric Acid Groups>

In the present invention, the ultrafine cellulose fibers preferably have phosphoric acid groups or substituents derived from the phosphoric acid group.

<Phosphoric Acid Group Introduction Step>

The phosphoric acid group introduction step may be performed by allowing at least one selected from a compound having phosphoric acid groups and salts thereof (hereinafter, referred to as a "compound A") to react with the fiber raw material including cellulose. Such a compound A may be mixed into the fiber raw material in a dry or wet state, in the form of a powder or an aqueous solution. In another example, a powder or an aqueous solution of the compound A may be added into slurry of the fiber raw material.

The phosphoric acid group introduction step may be performed by allowing at least one selected from a compound having phosphoric acid groups and salts thereof (a compound A) to react with the fiber raw material including cellulose. It is to be noted that this reaction may be performed in the presence of at least one selected from urea and derivatives thereof (hereinafter, referred to as "compound B").

One example of the method for allowing compound A to act on the fiber raw material in the presence of compound B includes a method of mixing the fiber raw material in a dry or wet state with a powder or an aqueous solution of compound A and compound B. Another example thereof includes a method of adding a powder or an aqueous solution of compound A and compound B to slurry of the fiber raw material. Among them, a method of adding an aqueous solution of compound A and compound B to the fiber raw material in a dry state, or a method of adding a powder or an aqueous solution of compound A and compound B to the fiber raw material in a wet state is preferred because of the high homogeneity of the reaction. Compound A and compound B may be added at the same time or may be added separately. Alternatively, compound A and compound B to be subjected to the reaction may be first added as an aqueous solution, which is then compressed to squeeze out redundant chemicals. The form of the fiber raw material is preferably a cotton-like or thin sheet form, though the form is not particularly limited thereto.

The compound A used in the present embodiment is at least one selected from a compound having phosphoric acid groups and salts thereof.

Examples of the compound having a phosphoric acid group include, but are not particularly limited to, phosphoric acid, lithium salts of phosphoric acid, sodium salts of phosphoric acid, potassium salts of phosphoric acid, and ammonium salts of phosphoric acid. Examples of the lithium salts of phosphoric acid include lithium dihydrogen phosphate, dilithium hydrogen phosphate, trilithium phosphate, lithium pyrophosphate, and lithium polyphosphate. Examples of the sodium salts of phosphoric acid include sodium dihydrogen phosphate, disodium hydrogen phosphate, trisodium phosphate, sodium pyrophosphate, and sodium polyphosphate. Examples of the potassium salts of phosphoric acid include potassium dihydrogen phosphate, dipotassium hydrogen phosphate, tripotassium phosphate, potassium pyrophosphate, and potassium polyphosphate. Examples of the ammonium salts of phosphoric acid include ammonium dihydrogen phosphate, diammonium hydrogen phosphate, triammonium phosphate, ammonium pyrophosphate, and ammonium polyphosphate.

Among them, from the viewpoints of high efficiency in introduction of the phosphoric acid group, an improving tendency of the defibration efficiency in a defibration step described below, low cost, and industrial applicability, phosphoric acid, sodium phosphate, potassium phosphate, and ammonium phosphate are preferred. Sodium dihydrogenphosphate, or disodium hydrogenphosphate is more preferred.

Further, since the uniformity of the reaction is improved and the efficiency in introduction of a phosphoric acid group is enhanced, the Compound A is preferably used as an aqueous solution. Although there is no particular restriction on the pH of an aqueous solution of the Compound A, the pH is preferably 7 or lower because the efficiency in introduction of a phosphoric acid group is high, and more preferably 3 to 7 from the viewpoint of suppression of hydrolysis of a pulp fiber. The pH of an aqueous solution of the Compound A may be adjusted, for example, by using, among compounds having a phosphoric acid group, a combination of an acidic one and an alkaline one, and changing the quantitative ratio thereof. The pH of an aqueous solution of Compound A may also be adjusted by adding an inorganic alkali or an organic alkali to an acidic compound among compounds having a phosphoric acid group.

The amount of the compound. A added to the fiber raw material is not particularly limited, but when the amount of the compound A added is converted to the amount of phosphorus atoms, the amount of phosphorus atoms added to the fiber raw material is preferably 0.5% by mass or more and 100% by mass or less, more preferably 1% by mass or more and 50% by mass or less, and the most preferably 2% by mass or more and 30% by mass or less. When the amount of phosphorus atoms added to the fiber raw material falls within the above-described range, the yield of the ultrafine cellulose fibers can be improved. If the amount of phosphorus atoms added to the fiber raw material exceeds 100% by mass, the effect of improving the yield has peaked and the cost of the compound A used is elevated. On the other hand, by setting the amount of phosphorus atoms added to the fiber raw material at not less than the above-described lower limit value, the yield may be increased.

Examples of the compound B used in the present embodiment include urea, thiourea, biuret, phenyl urea, benzyl urea, dimethyl urea, diethyl urea, tetramethyl urea, benzoylene urea, and hydantoin. Among them, urea is preferable because it is inexpensive, is easily handled, and easily forms a hydrogen bond with the fiber raw material having a hydroxyl group.

The compound B, as with the compound A, is preferably used as an aqueous solution. Moreover, an aqueous solution containing both of the compound A and the compound B dissolved therein is preferably used because of the enhanced homogeneity of the reaction. The amount of the compound B added to the fiber raw material is preferably 1% by mass or more and 300% by mass or less.

The reaction system may contain an amide or an amine in addition to the compound A and the compound B. Examples of the amide include formamide, dimethylformamide, acetamide, and dimethylacetamide. Examples of the amine include methylamine, ethylamine, trimethylamine, triethylamine, monoethanolamine, diethanolamine, triethanolamine, pyridine, ethylenediamine, and hexamethylenediamine. Among them, particularly, triethylamine is known to work as a favorable reaction catalyst.

In the phosphoric acid group introduction step, it is preferable to perform a heat treatment. For the temperature of the heat treatment, it is preferable to select a temperature that allows an efficient introduction of phosphoric acid groups, while suppressing the thermal decomposition or hydrolysis reaction of fibers. Specifically, the temperature is preferably 50° C. or higher and 300° C. or lower, more preferably 100° C. or higher and 250° C. or lower, and further preferably 150° C. or higher and 200° C. or lower. In addition, a vacuum dryer, an infrared heating device, or a microwave heating device may be used for heating.

Upon heat treatment, if the time for leaving the fiber raw material to stand still gets longer while the fiber raw material slurry to which the compound A is added contains water, as drying advances, water molecules and the compound A dissolved therein move to the surface of the fiber raw material. As such, there is a possibility of the occurrence of unevenness in the concentration of the compound A in the fiber raw material, and the introduction of phosphoric acid groups to the fiber surface may not progress uniformly. In order to suppress the occurrence of unevenness in the concentration of the compound A in the fiber raw material due to drying, the fiber raw material in the shape of a very thin sheet may be used, or a method may be employed of heat drying or vacuum drying the fiber raw material while kneading or stirring with the compound A using a kneader or the like.

As a heating device used for heat treatment, a device capable of always discharging moisture retained by slurry or moisture generated by an addition reaction of phosphoric acid groups with hydroxy groups of the fiber to the outside of the device system is preferred, and for example, forced convection ovens or the like are preferred. By always discharging moisture in the device system, in addition to being able to suppress a hydrolysis reaction of phosphoric acid ester bonds, which is a reverse reaction of the phosphoric acid esterification, acid hydrolysis of sugar chains in the fiber may be suppressed as well, and ultrafine fibers with a high axial ratio can be obtained.

The time for heat treatment is, although affected by the heating temperature, preferably 1 second or more and 300 minutes or less, more preferably 1 second or more and 1000 seconds or less, and further preferably 10 seconds or more and 800 seconds or less after moisture is substantially removed from the fiber raw material slurry. In the present invention, by setting the heating temperature and heating time within an appropriate range, the amount of phosphoric acid groups introduced can be set within a preferred range.

<Amount of Phosphoric Acid Groups Introduced>

The amount of phosphoric acid groups introduced is, per 1 g (mass) of the ultrafine cellulose fibers, preferably 0.1 mmol/g or more, more preferably 0.2 mmol/g or more, further preferably 0.3 mmol/g or more, and particularly preferably 0.5 mmol/g or more. The amount of phosphoric acid groups introduced is also, per 1 g (mass) of the ultrafine cellulose fibers, preferably 3.5 mmol/g or less, more preferably 3.0 mmol/g or less, further preferably 2.5 mmol/g or less, and particularly preferably 2.0 mmol/g or less. By setting the amount of phosphoric acid groups introduced within the above-described range, fibrillation of the fiber raw material becomes easy, and the stability of the ultrafine cellulose fibers can be enhanced.

The amount of phosphoric acid groups introduced into a fiber raw material may be measured by a conductometric titration method. Specifically, the introduced amount may be measured by performing fibrillation on ultrafine fibers in a defibration treatment step, treating the resulting slurry comprising ultrafine cellulose fibers with an ion exchange resin, and then examining a change in the electrical conductivity while adding a sodium hydroxide aqueous solution.

The conductometric titration confers a curve shown in FIG. 2, as an alkali is added. First, the electrical conductivity is rapidly reduced (hereinafter, this region is referred to as a "first region"). Then, the conductivity starts rising slightly (hereinafter, this region is referred to as a "second region"). Then, the increment of the conductivity is increased (hereinafter, this region is referred to as a "third region"). In short, three regions appear. Among them, the amount of the alkali required for the first region among these regions is equal to the amount of a strongly acidic group in the slurry used in the titration, and the amount of the alkali required for the second region is equal to the amount of a weakly acidic group in the slurry used in the titration. When condensation of a phosphoric acid group occurs, the weakly acidic group is apparently lost, so that the amount of the alkali required for the second region is decreased as compared with the amount of the alkali required for the first region. On the other hand, the amount of the strongly acidic group corresponds to the amount of the phosphorus atoms, regardless of the presence or absence of condensation. Therefore, the simple term "the amount of the phosphoric acid groups introduced (or the amount of the phosphoric acid groups)" or "the amount of the substituents introduced (or the amount of the substituents)" indicates the amount of the strongly acidic groups. That is to say, the amount (mmol) of the alkali required for the first region in the curve shown in FIG. 2 is divided by the solid content (g) in the slurry as a titration target to obtain the amount (mmol/g) of the substituent introduced.

The phosphoric acid group introduction step may be performed at least once, but may be repeated multiple times as well. This case is preferred since more phosphoric acid groups are introduced.

<Introduction of Carboxyl Groups>

In the present invention, when the ultrafine cellulose fibers have carboxyl groups, they can be introduced to the fibers by oxidation treatment, such as the TEMPO oxidation treatment mentioned above, or treatment using a compound having groups derived from a carboxylic acid, derivatives, or acid anhydrides or derivatives thereof.

Although there is no particular restriction on a compound having a carboxyl group, examples thereof include a dicarboxylic acid compound, such as maleic acid, succinic acid, phthalic acid, fumaric acid, glutaric acid, adipic acid, and itaconic acid, and a tricarboxylic acid compound, such as citric acid, and aconitic acid.

Although there is no particular restriction on an acid anhydride of a compound having a carboxyl group, examples thereof include an acid anhydride of a dicarboxylic acid compound, such as maleic anhydride, succinic anhydride, phthalic anhydride, glutaric anhydride, adipic anhydride, and itaconic anhydride.

Although there is no particular restriction on a derivative of a compound having a carboxyl group, examples thereof include an imide of an acid anhydride of a compound having a carboxyl group, and a derivative of an acid anhydride of a compound having a carboxyl group. Although there is no particular restriction on the imide of an acid anhydride of a compound having a carboxyl group, examples thereof include an imide of a dicarboxylic acid compound, such as maleimide, succinimide, and phthalimide.

There is no particular restriction on a derivative of an acid anhydride of a compound having a carboxyl group. Examples thereof include an acid anhydride of a compound having a carboxyl group, at least a part of the hydrogen atoms of which is substituted with a substituent (e.g. an alkyl group, and a phenyl group), such as dimethylmaleic anhydride, diethylmaleic anhydride, and diphenylmaleic anhydride.

<Amount of Carboxyl Groups Introduced>

The amount of carboxyl groups introduced is, per 1 g (mass) of the ultrafine cellulose fibers, preferably 0.1 mmol/g or more, more preferably 0.2 mmol/g or more, further preferably 0.3 mmol/g or more, and particularly preferably 0.5 mmol/g or more. The amount of carboxyl groups introduced is also preferably 3.5 mmol/g or less, more preferably 3.0 mmol/g or less, further preferably 2.5 mmol/g or less, and particularly preferably 2.0 mmol/g or less. By setting the amount of carboxyl groups introduced within the above-described range, it may become easy to make the fiber raw material ultrafine, and the stability of the ultrafine cellulose fibers can be enhanced.

<Cationic Substituent Introduction>

In this embodiment, a cationic substituent may be introduced into ultrafine cellulose fibers as an ionic substituent. For example, a cationic substituent may be introduced into a fiber raw material, by adding a cationizing agent and an alkaline compound to a fiber raw material and causing a reaction. As the cationizing agent, one having a group reactive with a quaternary ammonium group and a hydroxy group of cellulose may be used. Examples of the group reactive with a hydroxyl group of cellulose include an epoxy group, a functional group having a structure of halohydrin, a vinyl group, and a halogen group. Specific examples of the cationizing agent include a glycidyltrialkylammonium halide, such as glycidyltrimethylammonium chloride, and 3-chloro-2-hydroxypropyltrimethylammonium chloride, and a halohydrin form compound thereof.

The alkali compound contributes to promotion of a cationization reaction. The alkali compound may be an inorganic alkali compound, such as an alkali metal hydroxide, an alkaline earth metal hydroxide, an alkali metal carbonate, an alkaline earth metal carbonate, an alkali metal phosphate, an alkaline earth metal phosphate; or an organic alkali compound, such as ammonia, an aliphatic amine, an aromatic amine, an aliphatic ammonium, an aromatic ammonium, a heterocyclic compound and a hydroxide, a carbonate, a phosphate, etc. thereof. A measurement of an amount of a cationic substituent introduced may be carried out, for example, by an elemental analysis.

<Alkali Treatment>

In the case of producing the ultrafine cellulose fibers, alkali treatment can be performed between the substituent introduction step and a defibration treatment step mentioned later. Examples of the alkali treatment method include, but are not particularly limited to, a method of immersing the phosphoric acid group-introduced fibers in an alkali solution.

There is no particular restriction on an alkali compound contained in the alkaline solution, and it may be an inorganic alkaline compound or an organic alkali compound. The solvent of the alkaline solution may be either of water and an organic solvent. The solvent is preferably a polar solvent (water, or a polar organic solvent such as alcohol), and more preferably an aqueous solvent containing at least water.

Among alkaline solutions, a sodium hydroxide aqueous solution, or a potassium hydroxide aqueous solution is especially preferred, because of their multiplicity of uses.

The temperature of the alkali solution in the alkali treatment step is not particularly limited, but it is preferably 5° C. or more and 80° C. or less and more preferably 10° C. or more and 60° C. or less.

The immersion time in the alkali solution in the alkali treatment step is not particularly limited, but it is preferably 5 minutes or more and 30 minutes or less and more preferably 10 minutes or more and 20 minutes or less.

The amount of the alkali solution used in the alkali treatment is not particularly limited, but it is preferably 100% by mass or more and 100000% by mass or less and more preferably 1000% by mass and 10000% by mass or less, with respect to the absolute dry mass of the phosphoric acid group-introduced fibers.

In order to reduce the consumption of an alkaline solution in the alkali treatment step, a phosphoric acid group-introduced fiber may be washed with water or an organic solvent before the alkali treatment step. After the alkali treatment, the alkali-treated phosphoric acid group-introduced fiber is preferably washed with water or an organic solvent before the defibration treatment step in order to improve the handling property.

<Defibration Treatment>

The ionic substituent-introduced fibers are subjected to a defibration treatment in a defibration treatment step. In the defibration treatment step, a fiber is defibrated usually using a defibration treatment apparatus to obtain a slurry comprising ultrafine cellulose fibers, and there is no particular restriction on a treatment apparatus, or a treatment method.

A high-speed defibrator, a grinder (stone mill-type crusher), a high-pressure homogenizer, an ultrahigh-pressure homogenizer, a high-pressure collision-type crusher, a ball mill, a bead mill, or the like can be used as such a defibration treatment apparatus. Alternatively, for example, a wet milling apparatus such as a disc-type refiner, a conical refiner, a twin-screw kneader, an oscillation mill, a homomixer under high-speed rotation, an ultrasonic disperser, or a beater may be used as such a defibration treatment apparatus. The defibration treatment apparatus is not limited to those as described above. Examples of a preferred defibration treatment method include a high-speed defibrator, a high-pressure homogenizer, and an ultrahigh-pressure homogenizer, which are less affected by milling media, and are free from apprehension of contamination.

For the defibration treatment, the fiber raw material is preferably diluted into slurry using water and an organic solvent each alone or in combination, though the method is not particularly limited thereto. Water as well as a polar organic solvent can be used as a dispersion medium. Preferred examples of the polar organic solvent include, but are not particularly limited to, alcohols, ketones, ethers, dimethyl sulfoxide (DMSO), dimethylformamide (DMF), and dimethylacetamide (DMAc). Examples of the alcohols include methanol, ethanol, n-propanol, isopropanol, n-butanol, and t-butyl alcohol. Examples of the ketones include acetone and methyl ethyl ketone (MEK). Examples of the ethers include diethyl ether and tetrahydrofuran (THF). One of these dispersion media may be used, or two or more thereof may be used. The dispersion medium may also contain a solid content other than the fiber raw material, for example, hydrogen-binding urea.

According to the present invention, a defibration treatment may be performed after ultrafine cellulose fibers are concentrated and dried. In this case, there is no particular restriction on the method of concentration and drying, and examples thereof include a method in which a concentrating agent is added into a slurry comprising ultrafine cellulose fibers, and a method using a dehydrator, a press, a dryer, and the like used generally. Further, publicly known methods, for example as described in WO2014/024876, WO2012/107642, and WO2013/121086, may be used. Also, the concentrated ultrafine cellulose fibers may be formed into a sheet. It is also possible that the sheet may be pulverized and subjected to a defibration treatment.

As a pulverizing device used for pulverizing ultrafine cellulose fibers, a high-speed defibrator, a grinder (stone mill-type grinder), a high-pressure homogenizer, an ultra-high pressure homogenizer, a high-pressure collision type crusher, a ball mill, a bead mill, a disk type refiner, a conical refiner, a twin screw kneader, a vibrating mill, a device for wet milling, such as a high-speed rotating homomixer, an ultrasonic disperser, and a beater, may be used without limitation thereto.

Ultrafine cellulose fibers having phosphoric acid groups, which are obtained by the aforementioned method, are a slurry comprising ultrafine cellulose fibers, and the slurry may be diluted with water to a desired concentration. The slurry comprising ultrafine cellulose fibers is processed into a sheet and a fiber layer is formed according to a method as mentioned later.

<Density of Fiber Layer>

The density of the fiber layer is preferably 1.0 g/cm³ or more, more preferably 1.2 g/cm³ or more, and further preferably 1.4 g/cm³ or more. On the other hand, the density of the fiber layer is preferably 2.0 g/cm³ or less. The density of the fiber layer is calculated from the basis weight and thickness of the fiber layer in accordance with JIS P 8118. The basis weight of the fiber layer can be calculated in accordance with JIS P 8124. It is to be noted that, when the fiber layer comprises any given components other than ultrafine cellulose fibers, the density of the fiber layer indicates a density including any given components other than the ultrafine cellulose fibers.

In the present invention, the fiber layer may also be characterized by being a nonporous layer. In this context, a nonporous fiber layer means that the density of the entire fiber layer is 1.0 g/cm³ or more. When the density of the entire fiber layer is 1.0 g/cm³ or more, it means that the porosity included in the fiber layer is suppressed not more than a predetermined value, and the fiber layer is distinguished from porous sheets or layers.

Moreover, the nonporous fiber layer may also be characterized in that the porosity is 15% by volume or less. In this context, the porosity of the fiber layer is simply obtained according to the following Equation (a):

Porosity(% by volume)=$\{1-B/(M \times A \times t)\} \times 100$  Equation (a):

wherein A is the area (cm²) of the fiber layer, t is the thickness (cm) of the fiber layer, B is the mass (g) of the fiber layer, and M is the density of cellulose.

<Other Components>

Examples of other components comprised in the fiber layer include a hydrophilic polymer and an organic ion. Examples of the hydrophilic polymer include polyethylene glycol, cellulose derivatives (e.g., hydroxyethyl cellulose, carboxyethyl cellulose, carboxymethyl cellulose, etc.), casein, dextrin, starches, modified starches, polyvinyl alcohol, modified polyvinyl alcohol (e.g., acetoacetylated polyvinyl alcohol, etc.), polyethylene oxide, polyvinyl pyrrolidone, polyvinyl methyl ether, polyacrylates, polyacrylamide, alkyl acrylate ester copolymers, and urethane-based copolymers. Examples of the organic ion include tetraalkylammonium ions and tetraalkylphosphonium ions. Among them, polyethylene glycol and polyethylene oxide are preferably used, and polyethylene oxide is particularly preferable used.

Examples of the tetraalkylammonium ions include a tetramethylammonium ion, a tetraethylammonium ion, a tetrapropylammonium ion, a tetrabutylammonium ion, a tetrapentylammonium ion, a tetrahexylammonium ion, a tetraheptylammonium ion, a tributylmethylammonium ion, a lauryltrimethylammonium ion, a cetyltrimethylammonium ion, a stearyltrimethylammonium ion, an octyldimethylethylammonium ion, a lauryldimethylethylammonium ion, a didecyldimethylammonium ion, a lauryldimethylbenzylammonium ion, and a tributylbenzylammonium ion. Examples of the tetraalkylphosphonium ions include a tetramethylphosphonium ion, a tetraethylphosphonium ion, a tetrapropylphosphonium ion, a tetrabutylphosphonium ion, and a lauryltrimethylphosphonium ion. In addition, tetrapropylonium ions and tetrabutylonium ions may include tetra-n-propylonium ions and tetra-n-butylonium ions, respectively.

(Coating Layer)

A coating layer is laminated on at least one surface of the aforementioned fiber layer. The coating layer has water repellency, and the water contact angle of the surface which is measured 30 seconds after completion of the dropping of distilled water is 70 degrees or more. Since the coating layer is a layer capable of exhibiting the above-described water contact angle, it can also be referred to as a hydrophobic layer or a water repellent layer.

The surface (exposed surface) on the side opposite to the surface of the fiber layer, on which the coating layer is laminated, is preferably smooth. The coating layer is preferably an application layer formed by coating as described later. Hence, when the coating layer is formed, it is preferable that a coating solution used to form the coating layer be uniformly applied. Thus, by laminating a uniform and smooth layer as a surface layer, the transparency, water repellency and water resistance of the sheet of the present invention can be enhanced.

When the coating layer is formed on only one surface of the fiber layer, the coating layer is preferably formed on the surface opposite to the curling surface. Specifically, when the fiber layer is curled in a tunnel-like arc faun, the coating layer is preferably laminated on the outer surface of the arc.

By laminating the coating layer on the fiber layer to obtain the above-described configuration, generation of curl on the entire sheet can be suppressed.

As described later, the fiber layer is preferably formed on a base material by coating, drying and/or peeling. In this case, the peeled surface of the fiber layer (base material-contacted surface) is smoother than the other surface. Since this peeled surface is dried in a state in which it is constrained on the base material, it is easily contracted when it is peeled, and as a result, the fiber layer tends to be curled such that a convex portion comes to the side opposite to the peeled surface. As such, for the purpose of controlling the curling of the fiber layer, the coating layer is preferably formed on the surface opposite to the peeled surface of the fiber layer. Besides, since the peeled surface is smooth, the appearance also becomes favorable.

The basis weight of the coating layer is preferably 0.1 g/m$^2$ or more, and more preferably 0.5 g/m$^2$ or more. On the other hand, the basis weight of the coating layer is preferably 90 g/m$^2$ or less, and more preferably 45 g/m$^2$ or less. By setting the basis weight of the coating layer within the above-described range, water repellency and water resistance can be more effectively enhanced.

Components comprised in the coating layer are not particularly limited, as long as the coating layer is a layer having a water contact angle of 70 degrees or more under the above-described conditions. The coating layer is preferably a layer comprising at least one selected from a silicon-containing compound, a fluorine-containing compound and an acrylic resin. Among others, the coating layer is more preferably a layer comprising at least one selected from a silicon-containing compound and a fluorine-containing compound. Since the silicon-containing compound can enhance the strength of the coating layer, it is preferably used. In addition, the fluorine-containing compound can enhance the water repellency of the coating layer more effectively.

The silicon-containing compound comprised in the coating layer is preferably, for example, a condensate of an organosilane compound. The organosilane compound is an organic silicon compound, which contains a siloxane bond. When the organosilane compound is applied onto the fiber layer, it is hydrolyzed with water content in the air or the like, and is then dehydrated and/or condensed due to drying to form an oxygen-containing silicon film. Thus, the coated organosilane compound is present in the form of a hydrolyzed and dehydrated condensate of the organosilane compound in the coating layer.

Examples of the organosilane compound used in the hydrolysis and dehydration condensation reaction include: tetrafunctional organosilanes such as tetramethoxysilane or tetraethoxysilane; trifunctional or bifunctional alkoxysilanes such as methyltrimethoxysilane, methyltriethoxysilane, dimethyltrimethoxysilane, or dimethyltriethoxysilane; alkoxysilane hydrides such as trimethoxysilane or triethoxysilane; and hexamethyldisiloxane. These compounds can be used alone or as a mixture of two or more types. Among others, the organosilane compound is preferably hexamethyldisiloxane, tetramethoxysilane or tetraethoxysilane. From the viewpoint of improving the homogeneity of the coating layer, the organosilane compound is preferably tetrafunctional organosilane, and more preferably tetramethoxysilane or tetraethoxysilane. In particular, when tetramethoxysilane is used as such an organosilane compound, by laminating a coating layer, the haze of the entire sheet can be reduced in comparison to before laminating the coating layer, so that the transparency of the sheet can be more effectively enhanced.

The fluorine-containing compound is a compound having at least one fluorine atom in a single compound. The fluorine-containing compound preferably has two or more fluorine atoms in a single compound, and is more preferably a fluorine-containing resin having two or more fluorine atoms.

When a fluorine-containing resin is used as such a fluorine-containing compound, the fluorine-containing resin may be either an amorphous or crystalline fluorine-containing resin. From the viewpoint of improving transparency, the fluorine-containing resin is preferably an amorphous fluorine-containing resin. Examples of the fluorine-containing resin include tetrafluoroethylene (TFE), tetrafluoroethylene-perfluoroalkylvinyl ether (FA), tetrafluoroethylene-hexafluoropropylene (FEP), tetrafluoroethylene-ethylene (ETFE), vinylidene fluoride (VDF), chlorotrifluoroethylene (CTFE), and polymers or copolymers having, as a constituting unit, the unit represented by the following general formula (1).

[Formula 1]

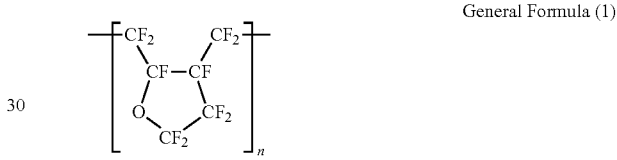

General Formula (1)

When such a fluorine-containing resin is used as a fluorine-containing compound, in order to enhance the adhesion properties thereof to ultrafine cellulose fibers comprised in the fiber layer, the fluorine-containing resin preferably has a carboxyl group or an alkoxysilyl group as a terminal group thereof or on a side chain thereof. The fluorine-containing resin more preferably has a carboxyl group or an alkoxysilyl group as a terminal group thereof.

Moreover, substitution of some fluoro groups contained in the fluorine-containing resin with hydroxyl groups is also effective for improving the adhesion properties thereof to ultrafine cellulose fibers.

Furthermore, from the improvement of adhesion properties, a compound, which forms a covalent bond with both the fluorine-containing resin and the ultrafine cellulose fibers, may be added into a coating solution used to form the coating layer (i.e., a coating layer-forming composition). Such a compound is preferably a compound containing, in a molecule thereof, two or more groups of at least one type selected from an isocyanate group, a carbodiimide group, an epoxy group, an alkoxysilyl group, a silanol group and an oxazoline group, and is particularly preferably a compound containing two or more isocyanate groups in a molecule thereof. It is to be noted that some of such compounds are detected in the coating layer.

The acrylic resin more preferably comprises a (meth)acrylic acid ester polymer. Especially, the acrylic resin is preferably a composite of a compound having silica particles and/or silanol groups with a (meth)acrylic acid ester polymer, and such a composite is preferably used from the viewpoint of the improvement of adhesion force. In this context, the (meth)acrylic acid ester polymer is preferably a copolymer formed by copolymerizing an acrylic monomer with a urethane structure or an epoxy structure, and is more preferably a copolymer formed by graft-copolymerizing an acrylic monomer with a urethane structure or an epoxy structure. In addition, the (meth)acrylic acid ester polymer may also be a copolymer formed by copolymerizing a (meth)acrylic acid ester with another monomer. When the acrylic resin is a (meth)acrylic acid ester copolymer, the mole fraction of monomers other than the (meth)acrylic acid ester in the copolymer is preferably 50 mole % or less.

It is to be noted that, in the present description, the "(meth)acrylic acid" means acrylic acid or methacrylic acid.

Further, from the improvement of adhesion properties, a compound, which forms a covalent bond with both the acrylic resin and the ultrafine cellulose fibers, may be added into a coating solution used to form the coating layer (i.e., a coating layer-forming composition). Such a compound is preferably a compound containing, in a molecule thereof, two or more groups of at least one type selected from an isocyanate group, a carbodiimide group, an epoxy group, an alkoxysilyl group, a silanol group and an oxazoline group, and is particularly preferably a compound containing two or more isocyanate groups in a molecule thereof. It is to be noted that some of such compounds are detected in the coating layer.

(Laminate)

The present invention may also relate to a laminate formed by further laminating an inorganic film (hereinafter, also referred to as an inorganic layer) on the sheet. The inorganic layer is preferably laminated on the side of the coating layer.

Substances constituting the inorganic layer are not particularly limited and examples thereof include aluminum, silicon, magnesium, zinc, tin, nickel, and titanium; oxides, carbides, nitrides, oxycarbides, oxynitrides, and oxycarbonitrides thereof; and mixtures thereof. From the viewpoint that high moisture resistance can be stably maintained, silicon oxide, silicon nitride, silicon oxycarbide, silicon oxynitride, silicon oxycarbonitride, aluminum oxide, aluminum nitride, aluminum oxycarbide, aluminum oxynitride, or mixtures thereof are preferred.

A method for forming an inorganic layer is not particularly limited. In general, methods of forming a thin film are roughly classified into Chemical Vapor Deposition (CVD) and Physical Vapor Deposition (PVD), either of which may be employed. Specific examples of CVD methods include plasma CVD, which utilizes plasma, and Catalyst Chemical Vapor Deposition (Cat-CVD) including catalytically cracking material gas using a heated catalyzer. Specific examples of PVD methods include vacuum deposition, ion plating, and sputtering.

As a method for forming an inorganic layer, Atomic Layer Deposition (ALD) can also be employed. The ALD method is a method for forming a thin film in an atomic layer unit by alternately supplying each of source gases of elements constituting the film to be formed to the surface on which a layer is to be formed. This method, albeit disadvantageous in a slow deposition rate, can more smoothly cover even a surface having a complicated shape than the plasma CVD method and has the advantage that a thin film having fewer defects can be formed. The ALD method also has the advantage that this method can control a film thickness at a nano order and can relatively easily cover a wide surface, for example. The ALD method can be further expected to improve a reaction rate, to achieve a low-temperature process, and to decrease unreacted gas, by using plasma.

The thickness of the inorganic layer is not particularly limited and is preferably 5 nm or larger, more preferably 10 nm or larger, further preferably 20 nm or larger, for exerting stable moisture barrier performance. The thickness of the inorganic layer is preferably 1000 nm or less, more preferably 800 nm or less, further preferably 600 nm or less, from the viewpoint of transparency and flexibility.

(Method for Producing Sheet)

The present invention relates to a method for producing a sheet. The step of producing the sheet of the present invention includes a step of obtaining a fiber layer comprising ultrafine cellulose fibers having a fiber width of 1000 nm or less, and a step of applying a coating layer-forming composition to at least one surface of the fiber layer. The haze of a sheet obtained by the above-described production step is 20% or less, and the water contact angle of the surface of the sheet on the side of the coating layer which is measured 30 seconds after completion of the dropping of distilled water is 70 degrees or more.

<Step of obtaining Fiber Layer comprising Ultrafine Cellulose Fibers>

The step of obtaining a fiber layer comprising ultrafine cellulose fibers includes a step of applying an ultrafine cellulose fiber-containing slurry onto a base material, or a step of papermaking from the ultrafine cellulose fiber-containing slurry. Among others, from the viewpoint of obtaining a porous fiber layer, the step of obtaining a fiber layer comprising ultrafine cellulose fibers includes preferably includes a step of applying an ultrafine cellulose fiber-containing slurry onto a base material.

<Coating Step>

A coating step is a step of applying ultrafine cellulose fiber-containing slurry on a base material, drying the slurry to form an ultrafine cellulose fiber-containing sheet, and detaching the sheet from the base material to obtain a sheet (fiber layer). Use of a coating apparatus and a long base material can continuously produce sheets. The concentration of slurry to be applied is not particularly limited and is preferably 0.05% by mass or more and 5% by mass or less.

The quality of the base material used in the coating step is not particularly limited. Although a base material having higher wettability to the ultrafine cellulose fiber-containing slurry is preferred because shrinkage of the sheet or the like upon drying is suppressed, it is preferred to select one from which a sheet formed after drying can be easily detached. Of these, a resin plate or a metal plate is preferred, without particular limitation. Examples thereof that can be used include resin plates such as acrylic plates, polyethylene terephthalate plates, vinyl chloride plates, polystyrene plates, and polyvinylidene chloride plates; metal plates such as aluminum plates, zinc plates, copper plates, and iron plates; plates obtained by the oxidation treatment of surface thereof; and stainless plates and brass plates.

When the ultrafine cellulose fiber-containing slurry has a low viscosity and spreads on the base material in the coating step, a damming frame is fixed and used on the base material in order to obtain an ultrafine cellulose fiber-containing sheet having a predetermined thickness and basis weight. The material of the damming frame is not particularly limited, and it is preferred to select ones from which edges of the sheet adhere after drying can be easily detached. Of these, frames formed from resin plates or metal plates are preferred, without particular limitation. Example thereof that can be used include frames formed from resin plates such as acrylic plates, polyethylene terephthalate plates, vinyl chloride plates, polystyrene plates, and polyvinylidene chloride plates; from metal plates such as aluminum plates, zinc plates, copper plates, and iron plates; from plates obtained by the oxidation treatment of surface thereof; and from stainless plates and brass plates.

Examples of a coater for applying ultrafine cellulose fiber-containing slurry that can be used include roll coaters, gravure coaters, die coaters, curtain coaters, and air doctor coaters. Die coaters, curtain coaters, and spray coaters are preferred because more even thickness can be provided.

The coating temperature is not particularly limited, and is preferably 20° C. or more and 45° C. or less, more preferably 25° C. or more and 40° C. or less, still more preferably 27° C. or more and 35° C. or less. When the coating temperature is equal to or higher than the lower limit described above, it is possible to easily apply the ultrafine cellulose fiber-containing slurry. When the coating temperature is equal to or lower than the upper limit described above, it is possible to prevent volatilization of the dispersion medium upon coating.

In the coating step, it is preferred to apply the slurry so as to achieve a finished basis weight of the sheet of 10 g/m$^2$ or more and 100 g/m$^2$ or less, preferably 20 g/m$^2$ or more and 50 g/m$^2$ or less. Applying the slurry so as to achieve a basis weight within the above range can give a fiber layer having excellent strength.

A step of obtaining a fiber layer containing ultrafine cellulose fibers preferably includes a step of drying the ultrafine cellulose fiber-containing slurry applied on the base material. The drying method is not particularly limited, and any of a contactless drying method and a method of drying the sheet while locking the sheet can be used, or these methods may be combined.

The contactless drying method is not particularly limited, and a method for drying by heating with hot air, infrared, far-infrared, or near-infrared (drying method by heating) or a method for drying in vacuum (vacuum drying method) can be utilized. Although the drying method by heating and the vacuum drying method may be combined, the drying method by heating is usually utilized. The drying with infrared, far-infrared, or near-infrared can be performed using an infrared apparatus, a far-infrared apparatus, or a near-infrared apparatus without particular limitations. The heating temperature for the drying method by heating is not particularly limited, and is preferably 20° C. or more and 120° C. or less, more preferably 25° C. or more and 105° C. or less. At the heating temperature equal to or higher than the lower limit described above, the dispersion medium can be rapidly volatilized. At the heating temperature equal to or lower than the upper limit described above, cost required for the heating can be reduced and the thermal discoloration of the ultrafine cellulose fibers can be suppressed.

After the drying, the ultrafine cellulose fiber-containing sheet is detached from the base material. When the base material is a sheet, the ultrafine cellulose fiber-containing sheet and base material may be rolled up in the laminated state, and the ultrafine cellulose fiber-containing sheet may be detached from the base material just before use of the ultrafine cellulose fiber-containing sheet.

<Papermaking Step>

The step of obtaining a fiber layer containing ultrafine cellulose fibers may include a step of papermaking from ultrafine cellulose fiber-containing slurry. Examples of a paper machine in the papermaking step include continuous paper machines such as a Fourdrinier paper machine, a cylinder paper machine, and an inclined paper machine, and a multilayer combination paper machine, which is a combination thereof. Known papermaking such as papermaking by hand may be carried out in the papermaking step.

In the papermaking step, the ultrafine cellulose fiber-containing slurry is wire-filtered and dehydrated to obtain a sheet in a wet state, and thereafter, the wet sheet is pressed and dried to obtain a sheet. The concentration of the slurry is not particularly limited, and it is preferably 0.05% by mass or more and 5% by mass or less. Upon filtration and dehydration of the slurry, a filter fabric for filtration is not particularly limited. It is important that ultrafine cellulose fibers do not pass through the filter fabric, and that the filtration speed is not excessively slow. Such filter fabric is not particularly limited, and a sheet consisting of organic polymers, a woven fabric, or a porous membrane is preferred. Preferred examples of the organic polymers include, but are not particularly limited to, non-cellulose organic polymers such as polyethylene terephthalate, polyethylene, polypropylene, and polytetrafluoroethylene (PTFE). Specific examples thereof include, but are not particularly limited to, a polytetrafluoroethylene porous membrane having a pore size of 0.1 μm or more and 20 μm or less, for example, 1 μm, and a woven fabric made of polyethylene terephthalate or polyethylene having a pore size of 0.1 μm or more and 20 μm, or less, for example, 1 μm.

A method for producing a sheet from ultrafine cellulose fiber-containing slurry is not particularly limited, and an example thereof is the method disclosed in WO2011/013567 comprising using a production apparatus. The production apparatus comprises a dewatering section for ejecting slurry containing ultrafine cellulose fibers on the upper surface of an endless belt and dewatering a dispersion medium contained in the ejected slurry to form a web and a drying section for drying the web to produce a fiber sheet. The endless belt is provided across from the dewatering section to the drying section, and the web formed in the dewatering section is transferred to the drying section while being placed on the endless belt.

A dehydration method that can be used in the present invention is not particularly limited. An example of the method is a dehydration method conventionally used for paper production. A preferred example is a method comprising performing dehydration using a Fourdrinier, cylinder, tilted wire, or the like and then performing dehydration using a roll press. In addition, a drying method is not particularly limited, and an example thereof is a method used for paper production and for example a method using a cylinder dryer, a yankee dryer, hot air drying, a near-infrared heater, or an infrared heater is preferred.

<Step of Forming Coating Layer>

In the step of forming a coating layer, a coating layer-forming composition is applied to at least one surface of the fiber layer. Example of the coater that can be used in the coating step include bar coaters, roll coaters, gravure coaters, die coaters, curtain coaters, and air doctor coaters.

The coating layer-forming composition preferably comprises at least one selected from a silicon-containing compound, a fluorine-containing compound, and an acrylic monomer. Among others, the coating layer-forming composition more preferably comprises at least one selected from a silicon-containing compound and a fluorine-containing compound. Since the silicon-containing compound can enhance the strength of the coating layer, it is preferably used. In addition, the fluorine-containing compound can enhance the water repellency of the coating layer more effectively.

When the coating layer-forming composition comprises an acrylic monomer, it may comprise a prepolymer of the acrylic monomer. The prepolymer may be composed of one type of acrylic monomer, or may also be composed of a combination of two or more types of acrylic monomers. Moreover, the prepolymer may also be a copolymer formed by copolymerizing an acrylic monomer with a urethane structure or an epoxy structure.

Examples of the acrylic monomer include 1,4-butanediol di(meth)acrylate, 1,6-hexanediol di(meth)acrylate, neopentyl glycol di(meth)acrylate, polyethylene glycol di(meth) acrylate, neopentyl glycol adipate di(meth)acrylate, hydroxypivalic acid neopentyl glycol di(meth)acrylate, dicyclopentanyl di(meth)acrylate, caprolactone modified dicyclopentenyl di(meth)acrylate, EO modified phosphoric acid di(meth)acrylate, allylated cyclohexyl di(meth)acrylate, isocyanurate di(meth)acrylate, trimethylolpropane tri(meth)acrylate, ethyleneoxide modified trimethylolpropane tri(meth)acrylate, dipentaerythritol tri(meth)acrylate, propionic acid modified dipentaerythritol tri(meth)acrylate, pentaerythritol tri(meth)acrylate, PO modified trimethylolpropane tri(meth)acrylate, tris(acryloxyethyl)isocyanurate, pentaerythritol tetraacrylate, ditrimethylolpropane tetraacrylate, dipentaerythritol penta(meth)acrylate, propionic acid modified dipentaerythritol penta(meth)acrylate, dipentaerythritol hexa(meth)acrylate, caprolactone modified dipentaerythritol hexa(meth)acrylate, and 1,10-decanediol diacrylate. Among them, the acrylic monomer is preferably at least one selected from pentaerythritol tetraacrylate, dipentaerythritol hexaacrylate, and 1,10-decanediol diacrylate. The acrylic monomer may be used alone or in combination of two or more types.

Furthermore, regarding the acrylic monomer, it is also preferable to use a monofunctional alkyl (meth)acrylate in combination with the aforementioned polyfunctional acrylic monomers. Examples of the monofunctional alkyl (meth)acrylate include pentyl (meth)acrylate, hexyl (meth)acrylate, heptyl (meth)acrylate, n-octyl (meth)acrylate, isooctyl (meth)acrylate, n-nonyl (meth)acrylate, isononyl (meth)acrylate, n-decyl (meth)acrylate, isodecyl (meth)acrylate, n-undecyl (meth)acrylate, lauryl (meth)acrylate, stearyl (meth)acrylate, isostearyl (meth)acrylate, isobornyl (meth)acrylate, and 2-ethylhexyl (meth)acrylate.

When the coating layer comprises a fluorine-containing resin as a fluorine-containing compound, the coating layer-forming composition preferably comprises a monomer as a constituting unit of the fluorine-containing resin.

On the other hand, when the coating layer comprises a silicon-containing compound, the coating layer-forming composition preferably comprises an organosilane compound. When the coating layer comprises an organosilane compound, the organosilane compound preferably comprises tetramethoxysilane as a structural unit.

After coating, a curing step is preferably provided. As such a curing step, a heat curing step is more preferably provided. In the heat curing step, it is preferable to heat the coating layer, for example, at a temperature of 25° C. or higher and 300° C. or lower, for 10 seconds or longer and 10 hours or shorter. In the heat curing step, for example, a method of drying by heating with hot air, infrared, far-infrared, or near-infrared (drying method by heating), or a method of drying in vacuum (vacuum drying method) can be applied. Moreover, in order to promote curing, it is more preferable for the coating layer to be cured at room temperature for approximately 1 day to 1 week.

In the curing step, a light curing step may be adopted, and also, a heat curling step and a light curing step may be carried out simultaneously. In this case, in the light curing step, ultraviolet ray is preferably applied at 300 nm or more and 450 nm or less in the range of 10 mJ/cm$^2$ or more and 8000 mJ/cm$^2$ or less.

(Intended Use)

Since the sheet of the present invention has excellent optical properties, it can be preferably used as an optical film. Specifically, the present sheet can be used as a display such as a flexible display, a touch panel, a liquid crystal display, a plasma display, an organic EL display, a field emission display or a display for rear-projection television, or an LED element. Moreover, the sheet can also be used as a display element, a lighting element, a solar cell or a window material, or a panel or a substrate therefor. The sheet of the present invention can be used as a substrate for solar cells such as silicon solar cells and dye-sensitized solar cells. For the intended use as a substrate, a barrier film, ITO, TFT, or the like may be laminated thereon.

Furthermore, the sheet of the present invention can also be used for structure materials, such as window materials for automobiles, rail vehicles, aircrafts, houses, office buildings, factories, and the like, materials for automobiles, rail vehicles, and aircrafts, such as glazing, interior materials, outer panels, and bumpers, enclosures for personal computers, components for home electronics, packaging materials, building materials, construction materials, fishery materials, and other industrial materials. Further, the sheet of the present invention is also preferable as a Wrapping film.

EXAMPLES

Hereinafter, the features of the present invention will be described more specifically with reference to Examples and Comparative Examples. The materials, used amounts, proportions, treatment content, treatment procedures, and the like shown in the following Examples can be appropriately changed to the extent that such changes do not depart from the spirit of the present invention. Therefore, the scope of the present invention should not be construed as being limited by the following specific examples.

Example 1

(Preparation of Ultrafine Cellulose Fiber Suspension A)

265 g of sodium dihydrogen phosphate dihydrate and 197 g of disodium hydrogen phosphate were dissolved in 538 g of water to obtain an aqueous solution of a phosphoric acid-based compound (hereinafter referred to as "phosphorylation reagent").

Needle bleached kraft pulp (manufactured by Oji Holdings Corporation; water content: 50% by mass; Canadian standard freeness (CSF) measured according to JIS P8121; 700 ml) was diluted with ion exchange water so as to have a water content of 80% by mass, thereby obtaining a pulp suspension. 210 g of the phosphorylation reagent was added to 500 g of this pulp suspension, and the resultant mixture was dried until the mass reached a constant weight while occasionally kneading with an air dryer at 105° C. (DKM 400, Yamato Scientific Co., Ltd.). Then, the mixture was heat treated for 1 hour while occasionally kneading with the air dryer at 150° C. to introduce a phosphoric acid group into the cellulose. The amount of the phosphoric, acid groups introduced at this time was 0.98 mmol/g.

Here, the amount of the phosphoric acid groups introduced was measured by diluting the cellulose with ion exchange water to a content of 0.2% by mass, then treating it with an ion-exchange resin, and then titrating it with alkali. In the treatment with the ion exchange resin, ⅒ by volume of a strongly acidic ion exchange resin (Amberjet 1024: conditioning agent, manufactured by Organo Corporation) was added to a slurry containing 0.2% by mass of the cellulose, and the resultant mixture was shaken for 1 hour. Then, the mixture was poured onto a mesh having 90 μm-apertures to separate the resin from the slurry. In the alkali titration, the change in the electric conductivity value indicated by the slurry was measured while adding a 0.1 N aqueous solution of sodium hydroxide to the slurry containing cellulose fibers after the ion exchange. Specifically, the alkali amount (mmol) required in the first region of the curve shown in FIG. 2 was divided by the solid content (g) in the slurry to be titrated, and the obtained value was defined as the amount (mmol/g) of the substituents introduced.

Next, 5000 ml of ion exchange water was added to the cellulose, into which the phosphoric acid groups had been introduced, and the resultant mixture was stirred and washed, and dehydration was then carried out. The dehydrated pulp was diluted with 5000 ml of ion exchange water, and a 1 N aqueous solution of sodium hydroxide was gradually added while stirring, until the pH was 12 or more and 13 or less to obtain a pulp suspension. Thereafter, the pulp suspension was dehydrated and was then washed with 5000 ml of ion exchange water. This dehydration and washing was repeated one more time.

Ion exchange water was added to the pulp obtained after the washing and dehydration to produce a pulp suspension having a solid concentration of 1.0% by mass. This pulp suspension was treated using a high-pressure homogenizer (Panda Plus 2000, manufactured by Niro Soavi) to obtain a cellulose suspension. In the treatment using the high-pressure homogenizer, the pulp suspension was passed through the homogenizing chamber five times at an operating pressure of 1200 bar. Further, the cellulose suspension was treated using a wet atomization apparatus (Ultimizer, manufactured by Sugino Machine Limited) to obtain an ultrafine cellulose fiber suspension. In the treatment using the wet atomization apparatus, the cellulose suspension was passed through the treatment chamber five times at a pressure of 245 MPa, so as to obtain an ultrafine cellulose fiber suspension A. The average fiber width of the ultrafine cellulose fibers contained in the ultrafine cellulose fiber suspension A was 5 nm.

(Production of Fiber Sheet B)

The concentration of the ultrafine cellulose fiber suspension A was adjusted, so that the solid concentration of the ultrafine cellulose fibers could be 0.5% by mass. Thereafter, 20 parts by mass of an aqueous solution containing 0.5% by mass of polyethylene oxide (manufactured by Wako Pure Chemical Industries, Ltd., molecular weight: 1,000,000), which is a hydrophilic polymer, was added as an oxygen-containing organic compound to 100 parts by mass of the ultrafine cellulose fiber suspension. Subsequently, the suspension was weighed, so that the sheet basis weight could be 80 g/m$^2$, was then spreaded (casted) onto a commercially available acrylic plate, and was then dried in a 50° C. oven to obtain a fiber sheet B (fiber layer). At this time, the thickness of the fiber sheet B was 53 μm, and the density of the fiber sheet B was 1.51 g/cm$^3$.

(Production of Sheet C)

A tetraethoxysilane compound-containing solution (MO-KUTO-G, manufactured by NITTOBO MEDICAL CO., LTD. (solid concentration: 18% by mass, solvent: butanol)) was applied as a coating layer-forming composition onto one surface of the fiber sheet B, using a bar coater, and was then dried at 100° C. for 15 minutes. Thus, a sheet C, in which a coating layer was laminated on the fiber sheet B, was obtained. At this time, the amount of the coating layer applied and dried was 4.8 g/m$^2$, and the thickness of the coating layer was 5 μm.

Example 2

(Production of Sheet D)

A tetraethoxysilane compound-containing solution (MO-KUTO-G, manufactured by NITTOBO MEDICAL CO., LTD.) was applied onto the surface of the sheet C, on which a coating layer was not laminated, using a bar coater, and was then dried at 100° C. for 15 minutes. Thus, a sheet D, in which coating layers were laminated on both surfaces of the fiber sheet B, was obtained. At this time, the amount of the coating layer applied to one surface and dried was 4.8 g/m$^2$, and the thickness of each coating layer was 5 μm.

Example 3

(Production of Sheet E)

A sheet E was obtained in the same manner as that of Example 1, with the exception that the amount of the tetraethoxysilane compound-containing solution applied upon production of the sheet C was changed, so that the amount of the coating layer applied and dried became 1.9 g/m$^2$, and the thickness of the coating layer became 2 μm.

Example 4

(Production of Sheet F)

A sheet F was obtained in the same manner as that of Example 1, with the exception that the tetraethoxysilane compound-containing solution was changed to a methyl ethyl ketone lysate (concentration: 15% by mass) of tetramethoxysilane (manufactured by Tokyo Chemical. Industry Co., Ltd.) upon production of the sheet C. At this time, the amount of the coating layer applied and dried was 4.8 g/m$^2$, and the thickness of the coating layer was 5 μm.

Example 5

(Production of Sheet G)

A sheet G was obtained in the same manner as that of Example 1, with the exception that the tetraethoxysilane compound-containing solution was changed to a methyl ethyl ketone lysate (concentration: 15% by mass) of hexamethyldisiloxane (manufactured by Tokyo Chemical Industry Co., Ltd.) upon production of the sheet C. At this time, the amount of the coating layer applied and dried was 4.8 g/m$^2$, and the thickness of the coating layer was 5 μm.

Example 6

(Production of Sheet H)

A sheet H was obtained in the same manner as that of Example 1, with the exceptions that the tetraethoxysilane compound-containing solution was changed to a solution (concentration: 8% by mass) prepared by diluting an amorphous fluorine resin (CTL-809A, manufactured by Asahi Glass Co., Ltd.) having a carboxyl group as a terminal group thereof with a fluorine-based solvent (CT-solv 80, manufactured by Asahi Glass Co., Ltd.) upon production of the sheet C, and that the solution was applied onto the surface of the sheet using a bar coater, and was then dried, successively, at 50° C. for 20 minutes, at 80° C. for 60 minutes, and at 200° C. for 60 minutes. At this time, the amount of the coating layer applied and dried was 4.8 g/m$^2$, and the thickness of the coating layer was 5 μm.

Example 7

(Production of Sheet I)

A sheet I was obtained in the same manner as that of Example 1, with the exception that the solution containing the amorphous fluorine resin having a carboxyl group as a terminal group thereof was changed to a solution (concentration: 8% by mass) prepared by diluting an amorphous fluorine resin (CTL-809M, manufactured by Asahi Glass Co., Ltd.) having an alkoxysilane group as a terminal group thereof with a fluorine-based solvent (CT-solv 80, manufactured by Asahi Glass Co., Ltd.) upon production of the sheet H. At this time, the amount of the coating layer applied and dried was 4.8 g/m², and the thickness of the coating layer was 5 µm.

Example 8

(Production of Sheet J)

A sheet J was obtained in the same manner as that of Example 1, with the exception that the tetraethoxysilane compound-containing solution was changed to a solution (concentration: 15% by mass) prepared by diluting a mixed solution of 100 parts by mass of a fluorine resin (Obbligato PS309R, manufactured by AGC COAT-TECH Co., Ltd.), some fluoro groups of which had been substituted with hydroxyl groups, and 10 parts by mass of an isocyanate-based curing agent (a curing agent for Obbligato PS, manufactured by AGC COAT-TECH Co., Ltd.), with methyl ethyl ketone upon production of the sheet C. At this time, the amount of the coating layer applied and dried was 4.8 g/m², and the thickness of the coating layer was 5 µm.

Example 9

(Production of Sheet K)

A sheet K was obtained in the same manner as that of Example 1, with the exceptions that, upon production of the sheet C, the tetraethoxysilane compound-containing solution was changed to a mixed solution of 100 parts by mass of a urethane acrylic resin (Acrit 8UA-347A, manufactured by Taisei Fine Chemical Co., Ltd.), which is an acrylic resin graft-polymerized with polyurethane, and 9.7 parts by weight of an isocyanurate compound (TPA-100, manufactured by Asahi Kasei Chemicals Corporation), and that the mixed solution was applied to the surface of the sheet using a bar coater, and was then dried at 100° C. for 60 minutes. At this time, the amount of the coating layer applied and dried was 4.8 g/m², and the thickness of the coating layer was 5 µm.

Comparative Example 1

A sheet consisting only of the fiber sheet B was obtained without laminating coating layers.

Comparative Example 2

The concentration of the ultrafine cellulose fiber suspension A was adjusted, so that the solid concentration of the ultrafine cellulose fibers could be 0.5% by mass. Thereafter, 20 parts by mass of an aqueous solution containing 0.5% by mass of polyethylene oxide (manufactured by Wako Pure Chemical Industries, Ltd., molecular weight: 1,000,000), which is a hydrophilic polymer used as an oxygen-containing organic compound, and 10 parts by mass of an alkylketene dimer (AKD1602, manufactured by Seiko Chemical Corporation), which is an oil component that is in a solid state at 25° C., were each added to 100 parts by mass of the ultrafine cellulose fiber suspension. Subsequently, the suspension was weighed, so that the sheet basis weight could be 80 g/m², was then spreaded (casted) onto a commercially available acrylic plate, and was then dried in a 50° C. oven to obtain a fiber sheet L. At this time, the thickness of the fiber sheet L was 53 µm, and the density of the fiber sheet L was 1.51 g/cm³.

(Measurement)

With regard to the sheets produced in Examples and Comparative Examples, the water contact angle, water resistance, haze, total light transmittance, tensile elastic modulus, and adhesion properties thereof were each measured by the following methods. The results are shown in Table 1. It is to be noted that, regarding the water contact angle and the water resistance, the surface of the sheet on the side of the coating layer was measured (wherein when a coating layer was not laminated, the surface of the fiber layer was measured).

(Water Contact Angle)

In accordance with JIS R 3257, using a dynamic water contact angle testing machine (1100 DAT, manufactured by Fibro), 4 µL of distilled water was dropped onto the surface of a sheet, and the water contact angle 30 seconds after completion of the dropping was measured.

(Water Resistance)

1 mL of distilled water was dropped onto the surface of a sheet, and 30 seconds after completion of the dropping, the dropped water droplets were wiped off from the sheet using KimWipes (manufactured by NIPPON PAPER CRECIA Co., LTD.). Then, the condition of the surface of the sheet was evaluated according to the following criteria.

○: Completely no traces of water droplets remain on the surface of a sheet, and thus, water resistance is extremely favorable.

x: The traces of water droplets remain on the surface of a sheet, and thus, the sheet is poor in terms of water resistance.

(Haze)

The haze was measured in accordance with JIS K 7136: 2000, by using a haze meter (HM-150, manufactured by Murakami Color Research Laboratory Co., Ltd.).

(Total Light Transmittance)

The total light transmittance was measured in accordance with JIS K 7361: 1997, by using a haze meter (HM-150, manufactured by Murakami Color Research Laboratory Co., Ltd.).

(Tensile Elastic Modulus)

The tensile modulus at a temperature of 23° C. and a relative humidity of 50% was measured in accordance with JIS P8113, by using a tensile tester (Tensile Tester CODE SE-064, manufactured by L & W Co.).

(Adhesion Properties)

In accordance with JIS K 5400, a hundred of 1 mm² cross cuts were made on the surface of a sheet on the fiber layer side, cellophane tape (manufactured by Nichiban Co., Ltd.) was then stuck thereon, a load of 1.5 kg/cm² was then pressed thereon, and the tape was then peeled off in a 90° direction. The adhesion properties between the fiber layer and the coating layer were evaluated based on the number of peeled grids.

TABLE 1

| | Example 1 | Example 2 | Example 3 | Example 4 | Example 5 | Example 6 | Example 7 | Example 8 | Example 9 | Comparative Example 1 | Comparative Example 2 |
|---|---|---|---|---|---|---|---|---|---|---|---|
| Sheet type | Sheet C | Sheet D | Sheet E | Sheet F | Sheet G | Sheet H | Sheet I | Sheet J | Sheet K | Fiber sheet B | Fiber sheet L |

TABLE 1-continued

| | | Example 1 | Example 2 | Example 3 | Example 4 | Example 5 | Example 6 | Example 7 | Example 8 | Example 9 | Comparative Example 1 | Comparative Example 2 |
|---|---|---|---|---|---|---|---|---|---|---|---|---|
| Layer configuration | — | Coated with organosilane compound | Coated with organosilane compound (both surfaces) | Coated with organosilane compound (reduction in film thickness) | Coated with organosilane compound | Coated with organosilane compound | Coated with fluorine-containing compound | Coated with fluorine-containing compound | Coated with fluorine-containing compound | Coated with acrylic resin | No coating layer | Oil component added into fiber layer |
| Type of fiber layer | — | Fiber sheet B | Fiber sheet B | Fiber sheet B | Fiber sheet B | Fiber sheet B | Fiber sheet B | Fiber sheet B | Fiber sheet B | Fiber sheet B | Fiber sheet B | Fiber sheet L |
| Thickness of fiber layer ($T_1$) | μm | 53 | 53 | 53 | 53 | 53 | 53 | 53 | 53 | 53 | 53 | 53 |
| Density of fiber layer | g/cm$^3$ | 1.51 | 1.51 | 1.51 | 1.51 | 1.51 | 1.51 | 1.51 | 1.51 | 1.51 | 1.51 | 1.51 |
| Coating layer-containing compound | — | TEOS | TEOS (both surfaces) | TEOS | TMOS | HMDSO | CTL-809A | CTL-809M | PS309R | 8UA-347A | — | — |
| Thickness of coating layer ($T_2$) | μm | 5 | 5 μm (one surface) × 2 surfaces | 2 | 5 | 5 | 5 | 5 | 5 | 5 | — | — |
| $T_1/T_2$ | — | 10.6 | 10.6 | 26.5 | 10.6 | 10.6 | 10.6 | 10.6 | 10.6 | 10.6 | — | — |
| Water contact angle | degree | 85 | 85 | 85 | 80 | 75 | 94 | 98 | 90 | 78 | 20 | 87 |
| Water resistance | — | ○ | ○ | ○ | ○ | ○ | ○ | ○ | ○ | ○ | x | x |
| Haze | % | 1.0 | 1.0 | 0.9 | 2.0 | 2.5 | 1.0 | 1.0 | 1.2 | 2.0 | 1.5 | 25.0 |
| Total light transmittance | % | 92 | 92 | 92 | 91 | 90 | 92 | 92 | 92 | 91 | 92 | 90 |
| Tensile elastic modulus | GPa | 11.6 | 11.5 | 11.5 | 11.5 | 11.4 | 11.2 | 11.1 | 11.0 | 11.2 | 11.5 | 10.7 |
| Adhesion properties (number of peeled grids/100 grids) | grids/100 | 0/100 | 0/100 | 0/100 | 0/100 | 0/100 | 0/100 | 0/100 | 0/100 | 0/100 | — | — |

TEOS: Tetraethoxysilane
TMOS: Tetramethoxysilane
HMDSO: Hexamethyldisiloxane
CTL-809A: Amorphous fluorine resin (with terminal carboxyl group)
CTL-809M: Amorphous fluorine resin (with terminal alkoxysilane group)
PS309R: (containing hydroxyl group)
8UA-347A: Urethane acrylic resin As is apparent from Table 1, the sheets obtained in Examples had large water contact angle and excellent water resistance. In addition, the sheets obtained in Examples had small haze and excellent transparency. Moreover, the sheets obtained in Examples were also excellent in terms of adhesion properties between the fiber layer and the coating layer. Besides, it could also be confirmed that all of the sheets obtained in Examples had sufficient strength.

In contrast, the sheet obtained in Comparative Example 1 had small water contact angle and was poor in terms of water resistance. The sheet obtained in Comparative Example 2 was poor in terms of water resistance, although it had large water contact angle. In addition, the sheet obtained in Comparative Example 2 had large haze and insufficient transparency.

REFERENCE SIGNS LIST

10 SHEET
12 FIBER LAYER
14 COATING LAYER

The invention claimed is:

1. A sheet having a fiber layer and a coating layer on the fiber layer, wherein
   the fiber layer comprises ultrafine cellulose fibers having a fiber width of 1000 nm or less in an amount of 60% by mass or more,
   the haze of the sheet is 20% or less,
   the tensile elastic modulus of the sheet is 5 GPa or more, and
   the water contact angle of the surface of the sheet on the side of the coating layer which is measured 30 seconds after completion of the dropping of distilled water is 70 degrees or more.

2. The sheet according to claim 1, wherein the coating layer comprises at least one selected from a silicon-containing compound, a fluorine-containing compound, and an acrylic resin.

3. The sheet according to claim 1, wherein when the thickness of the fiber layer is defined as $T_1$ and the thickness of the coating layer is defined as $T_2$, the value of $T_1/T_2$ is 2 or more and 200 or less.

4. The sheet according to claim 1, wherein the total light transmittance is 60% or more.

5. The sheet according to claim 2, wherein the haze is 5% or less.

6. The sheet according to claim 1, wherein the density of the fiber layer is 1.0 g/cm$^3$ or more.

7. The sheet according to claim 1, wherein when a cross cut test is carried out in accordance with JIS K 5400, the number of peeling in 100 grids of the fiber layer is 10 or less.

8. The sheet according to claim 1, wherein the coating layer is an application layer.

9. A method for producing a sheet, comprising
obtaining a fiber layer comprising ultrafine cellulose fibers having a fiber width of 1000 nm or less, and
applying a coating layer-forming composition to at least one surface of the fiber layer, wherein
the haze of the sheet is 20% or less,
the tensile elastic modulus of the sheet is 5 GPa or more, and
the water contact angle of the surface of the sheet on the side of the coating layer which is measured 30 seconds after completion of the dropping of distilled water is 70 degrees or more.

10. The method for producing a sheet according to claim 9, wherein the coating layer-forming composition comprises at least one selected from a silicon-containing compound, a fluorine-containing compound, and an acrylic monomer.

* * * * *